Jan. 1, 1924
D. J. HAMMER
1,479,068
INNER TUBE FOR THE TIRES OF VEHICLES
Filed March 23, 1923
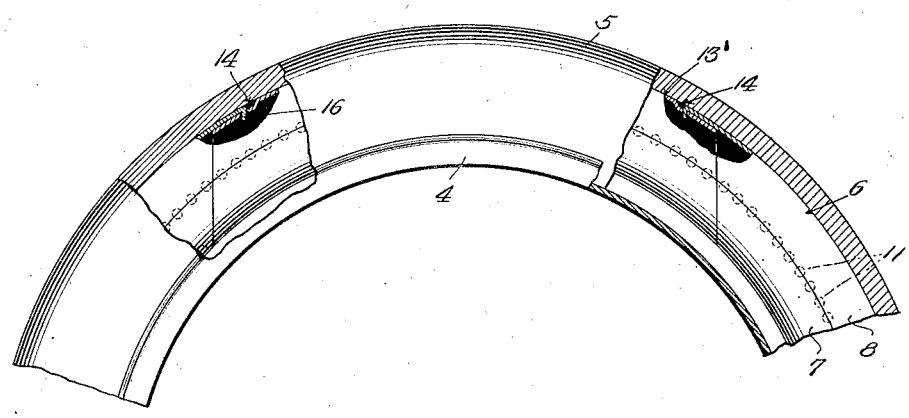
Fig. 1.
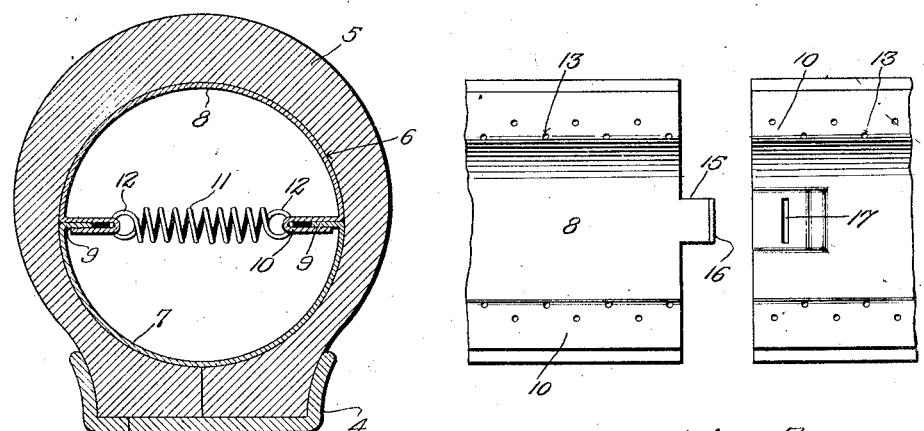
Fig. 2.
Fig. 3.
Inventor
David J Hammer
By Bernard F. Garvey
Attorney Patented Jan. 1, 1924.

1,479,068

UNITED STATES PATENT OFFICE.

DAVID JACOB HAMMER, OF PITTSBURGH, PENNSYLVANIA, ASSIGNOR OF ONE-HALF TO JAMES H. FLINN AND JAMES McEWAN, BOTH OF PITTSBURGH, PENNSYLVANIA.

INNER TUBE FOR THE TIRES OF VEHICLES.

Application filed March 23, 1923. Serial No. 627,157.

*To all whom it may concern:*

Be it known that I, DAVID JACOB HAMMER, a citizen of the United States, residing at Pittsburgh, in the county of Allegheny and State of Pennsylvania, have invented certain new and useful Improvements in Inner Tubes for the Tires of Vehicles, of which the following is a specification.

The present invention relates to inner tubes for the tires of vehicles.

An object of the invention is to substitute an indestructible inner tube for the rubber tube now commonly used and to mount this indestructible tube in the cavity of the tire casing in precisely the same manner as rubber tubes are now commonly mounted therein.

A further object of the invention is to provide an inner tube which, although indestructible and capable of use for an indefinite period of time is also characterized by all the features of resiliency and flexibility necessary to absorb shock from the vehicle.

Still another object of the invention is to provide an inner tube of simple construction capable of expeditious assembly and manufacturable at a comparatively low cost.

Other objects of the invention will be apparent from the following description of the present preferred form of the invention taken in connection with the accompanying drawings wherein:—

Fig. 1 is a fragmentary side elevational view of a vehicle tire embodying an inner tube constructed in accordance with this invention;

Fig. 2 is a cross sectional view of the same; and

Fig. 3 is a plan view looking at the inside of adjacent terminals of the inner tube showing the manner in which these terminals are connected together.

In the drawings in order to illustrate the application of this invention, a vehicle wheel felly rim 4 and tire casing 5, both of standard construction, are shown. It is of course to be understood that any standard type of felly rim and casing may be used.

An inner tube generally designated 6 constitutes the present invention and is mounted in the inner tube cavity of the casing 5 in a manner well known in the art. The inner tube in the present instance consists especially of an inner metallic section 7 and an outer metallic section 8. The marginal edges of the section 7 are bent inwardly at right angles to provide flanges 9. The outer section 8 has its marginal edges bent inwardly at right angles and then reversely folded to provide channels 10 in which the flanges 9 are slidably mounted. It will be noted that the channels 10 are relatively longer than the flanges 9 so that the latter may move an appreciable distance therein.

It is to be understood that the sections 7 and 8 are made of an inherently resilient metal, such as sheet steel so that for the most part shock will be absorbed from the vehicle due to the inherent characteristics of these sections. However, in order to provide for the positive absorption of shock even though undue pressure be applied to the casing, secondary absorbing elements are provided which in the present instance consists of a series of helical springs 11. The terminal convolutions 12 of each spring are bent outwardly to provide loops whose axes lie at right angles to the longitudinal axis of the springs and are adapted for engagement in apertures 13 formed in the channels 10. These apertures are arranged in staggered relation, and correspondingly, the coil springs vary in length. When excess pressure is brought to bear on the tread surface of the casing the channels 10 will be flexed outwardly against the resistance of the springs 11 causing said channel members to slide on the flanges 9 of the inner section 7.

To facilitate assemblage of the inner tube in the tire casing, a segment of the inner tube, generally designated 13′ may be removable. This segment is formed just the same as the balance of the tube except that depressions 14 are formed in the outer periphery of the segment adjacent the terminals thereof and are adapted for the reception of lugs 15 which issue from the terminals of the outer section 8 of the tube. The upper terminals of the lugs are bent inwardly at an oblique angle, as indicated at 16, and are engageable in complemental slots 17 formed in the depressed portions of the segment 13′. The terminals of the segment and adjacent terminals of the body of the inner tube are adapted to correspond so as to fit snugly together. In the present instance they are shown to be disposed at an inclination which facilitates introduction of the segment between the terminals of the inner tube proper in an apparent manner.

It is to be understood that various changes may be made in this device especially in the details of construction, proportion and arrangement of parts within the scope of the appended claims.

It is of importance, however, that the inner tube be so constructed as to conveniently fit in the cavity of standard types of tire casings. It is coordinately important that the tube be formed from corresponding sections which will flex under pressure to absorb shock so as to function in substantially the same manner as the rubber inner tubes.

What is claimed is:—

1. An inner tube for vehicle tires including complemental metallic sections connected together to provide a tube circular in cross section for engagement in the cavity of a tire casing, said sections being relatively movable under pressure, and resilient means engaged with one of said sections to absorb shock and prevent undue flexure of the sections.

2. An inner tube for vehicle tires including inner and outer sections equipped with co-acting marginal edges, and resilient means connecting the edges of one of said sections.

3. An inner tube for vehicle tire casings including metallic sections the marginal edges of one of which is equipped with channels and the marginal edges of the other equipped with flanges slidably mounted in said channels, and means connecting the channel portions of the first said section.

4. An inner tube for vehicle tires including semi-cylindrical sections of inherently resilient material movably connected together, and resilient means engaged with certain of said sections and yieldable under movement of the latter when pressure is applied to the tire.

DAVID JACOB HAMMER.